Patented June 20, 1933

1,914,489

UNITED STATES PATENT OFFICE

EMILE DE STUBNER, OF NEW YORK, N. Y.

COLORED SOLUBLE CELLULOSE AND PROCESS FOR MAKING SAME

No Drawing.    Application filed January 8, 1930.    Serial No. 419,471.

This invention relates to a new process and a new article of manufacture. It is in part a continuation of the subject matter of my co-pending applications for Pigmented soluble cellulose and process of making same bearing Serial No. 197,238, filed June 7th, 1927; as well as Pigments and process for making same bearing Serial No. 137,382, filed September 23rd, 1926. In that application I disclose the process of manufacturing pigmented soluble cellulose and dehydrating the same. I also disclose the process of precipitating pigments directly upon soluble fibrous cellulose. In the within case, I disclose the process of creating an alcoholic wet (non-aqueous) pigment pulp, introducing the same into soluble cellulose and obtaining an alcoholic colored soluble cellulose. Likewise, it must be understood that I may create my alcoholic wet pigment pulp by using any class or kind of pigments. In other words, I have previously described the conversion of an aqueous pigment pulp and water-wet soluble cellulose. In this application, I shall describe direct means for producing colored soluble cellulose damp or wet with a non-aqueous liquid.

For the purpose of this invention, it may now be advisable to briefly define some of the terms which I will hereafter use in the manner that I wish them to be understood.

I define "pigment" as a solid, suitable for coloration, insoluble in water, as well as in the liquid which wets the compound, i. e. the fibrous soluble cellulose and pigment.

I define "soluble cellulose" as cellulose $(C_6H_{10}O_5)_x$ treated chemically and thereby no longer corresponding to the carbohydrate $(C_6H_{10}O_5)_x$ which is cellulose. Soluble celluloses are celluloses in which hydroxyl-groups have been substituted and thereby have been made soluble in the conventional sense.

I define "fibrous" as a quality of a substance capable of being spun and woven, therefore solid and undissolved.

I define "pigment-pulp" as a pigment sufficiently damp or wet with a liquid (resembling mud) to permit of and accelerate its highest percentage of dispersion into fibrous soluble cellulose.

I define "colored fibrous soluble cellulose" as the product resulting from the dispersion of pigment pulp into fibrous soluble cellulose.

I define an "end product" as a product utilizing or containing colored fibrous soluble cellulose.

It is one object of my present invention to disclose a more efficient process for the handling of pigments, for example, the black pigments, such as carbon black and lamp black. Carbon black, as now distributed, as powder in bags, is found to cover all objects adjacent the point of handling with black dust. This I will avoid. It is my further object to avoid the grinding of pigments dry as well as to avoid grinding with the conventional grinding media such as oils (castor oil), plasticizers (di-butyl-phthalate) and resin solutions.

This grinding is often a very time, money and labor consuming operation, for dry pigments often offer great resistance to grinding, as may be recognized from the following: In general, the grinding of pigments into varnishes, oils, lacquers, etc., aims at the finest possible and most even distribution of pigments in the media surrounding them. To accomplish this, it is necessary that, on the one hand the pigment must be very fine or of very small particle size, and that, on the other hand pigment and medium are most intimately mixed. At present, pigments can be obtained from the manufacturer in a very fine state. The grinding of the pigment into the medium is, in fact, not accompanied by a further disintegration of the pigment-particle into smaller particles, for the medium acts as a lubricant, thereby diminishing friction of the grinding parts of the grinding machine. The grinding is in fact limited to a thorough wetting and penetrating of the pigment with the medium as well as squeezing and tearing apart of the balled and baked together primary particles. The thorough penetration of pigment by medium depends, in a large measure, upon the surface tension at the point of contact between pigment and medium. The smaller this factor of surface tension, the easier it is for the medium to completely wet and penetrate the pigment. On one side therefore, one and the same medium acts differently as regards its wetting and penetrating qualities toward different pigments, and on the other side, one and the same pigment is wetted and penetrated in different degrees by different media. Apart from this tension of surfaces at the point of contact, wetting depends also upon the tendency of the particle sizes to form agglomerates. Since dampness is conducive to this balling together, the pigments should be perfectly dry and free from moisture. Of course moisture would also be detrimental to the finished product. Also during grinding there may be developed chemical and colloid-chemical problems together with the purely physical ones.

For perfect penetration of a pigment of a given particle size, it is necessary to accomplish the following:

A: Wetting the particles with the medium.

B: Tearing apart of agglomerates thoroughly wetted though they may be.

Since viscous fluids such as oils, resin-solutions, cellulose-ester or cellulose-ether solutions are notoriously bad wetting media, pigments offer indeed great resistance to penetration by them and therefore the long time required for grinding. For example, it is not uncommon to grind for 100 hours and more to accomplish penetration of carbon black by certain media (such as lacquer bases and the like).

I believe that pigment-clots or agglomerates are extensively the result of electrical charges and that in the conventional methods of producing pigment pulps, the pulping medium being under friction during pulping, becomes charged electrically as water, for example, under friction may become positively charged and this condition causes a further tendency to agglomerate. On the other hand, soluble cellulose, when dissolved, possesses great di-electric strength or is a good insulator which prevents these agglomerates from becoming discharged and the problem therefore becomes a grinding problem, namely, a forceful disintegration and dispersion. Now, soluble fibrous cellulose in its undissolved condition represents all the potential energies accumulated during its manufacture capable of being expressed in physical magnitude and therefore capable of measurement. These energies are available to cause a dispersion of the pigment pulp throughout the mass of the fibrous soluble cellulose. The situation is analogous to that of a steel watch spring which may be compared to the undissolved soluble fibrous cellulose. If the wound spring is dissolved in hydrochloric acid, the energy put into it by winding would be lost. The latent potential energies of soluble cellulose when still in fibrous form serve to deflocculate and disperse the pigment-agglomerates.

My process of producing colored soluble cellulose eliminates this time, energy and money consuming grinding. Lacquer, per se, is a poor wetting agent (medium) indeed, but some of its constituents are excellent wetting agents (such as alcohol) and my invention consists of selecting the good wetting agents (bearing in mind a particular type of end product) to do efficient work, as such, the object being first creation of a pigment pulp. However, even after the pigments have been thoroughly wetted, the step of tearing apart the agglomerates still remains to be done, for in order to accomplish the dispersion of the pigment evenly in the lacquer or other end products, having a soluble cellulose base, there must be no agglomerates. This tearing apart is accomplished by the fibers of the soluble cellulose when mixed together with the wetted pigment (pigment pulp). The fibers act to reduce the agglomerates into their separate individual particles. When this operation is finished, the production of colored soluble fibrous cellulose has been accomplished. In order to make a final end product, such as colored or pigmented lacquer, all that needs to be done is to add a solvent, such as ethyl acetate, to the pigmented soluble fibrous cellulose and when it is dissolved, add the remaining constituents of commercial lacquer, such as resins, oils, diluents (gum damar, castor-oil, toluene). So with any other final or end products such as artificial leather, printer's ink and the like.

The following examples will illustrate my invention. Dry or dried pigments such as: Iron-oxides, siennas, ochres, umbers, titanium oxides, lithopone, zinc oxides, carbon black, lamp black, bone black, prussian blue, ultramarine, zinc-chromate, lead-chromate, toluidine red, para-toner, lakes, such as alizarine-lakes and others, sulphur dyes, vat-dyes (for they are indeed organic pigments), aniline black, chrome-oxides, graphite, in fact any dry or dried pigment is first pulped, in an efficient non-aqueous (alcoholic) wetting medium, to the specified fineness necessary to produce a non-aqueous pigment pulp, the pulping medium being the non-aqueous liquid (alcohol). This non-aqueous pigment pulp physically resembles aqueous pigment pulp, but chemically it is different, for the liquid component of this pulp is non-aqueous. While every particle in this non-aqueous pigment pulp is thoroughy wetted it will develop, on standing, agglomerates, physically resembling blood-clots. When this non-aqueous pigment pulp is mixed with fibrous soluble cellulose, under agitation, these clots are separated by the fibers and colored fibrous soluble cellulose, damp or wet with the non-aqueous pulping medium of the pigment-pulp, and of the color of the pigment results.

The alcoholic wetting medium above referred to may be the commercial alcohol denatured according to Government formula No. 1. Such denatured alcohol consists of approximately 100 parts by volume of ethyl alcohol, 10 parts by volume of wood alcohol, and .05 part by volume of benzene.

The following examples will illustrate the process of making a black colored soluble fibrous cellulose:

Example I

Place into a kneading-machine or dough-machine of the type of Werner & Pfleiderer, for instance, 250 parts of super spectra black, which is a carbon black of very high quality, then add, while the agitators are kept going, 600 parts of alcohol (90–96%) and keep the agitators going until the black pigment is thoroughly wetted. This is easily recognized, for the black takes on a sheen. Now add, in small portions, 400 parts of alcohol-wet nitro-cellulose in fibrous form. Agitators are kept in operation during this time until a stiff plastic dough is obtained. This takes from 2 to 3 hours. A sample may be taken and dissolved in a small amount of ethyl-acetate. Of course, this dissolves only the nitro-cellulose, for the black is insoluble. Not more ethyl-acetate should be used than is just sufficient to make a paste. This paste may be added to a small amount of clear lacquer and when this lacquer comes up to a required standard, the whole batch in the machine from which the dough sample was taken is finished colored nitro-cellulose, ready for use in any final or end product.

Example II

Instead of wetting black pigment in a kneading machine, it may be done in a pebble-mill, which has the advantage of being enclosed and thus prevents the light and dusty black from permeating the surrounding atmosphere. However, in order to permit the pebbles to move freely, more alcohol has to be added, i. e. instead of 600 parts, as in Example I, 1000 parts will be necessary. The mill is kept going for about 3 hours and then emptied into a settling tank, where the black pigment, now thoroughly wetted, sinks to the bottom. The supernatent alcohol is drawn off and used for another batch. The alcoholic black-pulp is now transferred into the kneading machine and treated with fibrous nitro-cellulose as in Example I.

Example III

Into the kneading machine of Example I are placed 400 parts of alcohol wet fibrous nitrocellulose. I mean by this commercial nitrocellulose as it may be purchased in the market and as it is permitted to be transported in compliance with the specification of the I. C. C., i. e. containing about 30% alcohol of 90–96%. To this 400 parts of nitrocellulose are now added, alternately, 150 more parts of alcohol and then 60 parts of black pigment, then 150 parts of alcohol and again 60 parts of black pigment until the total in the machine corresponds to Example I, i. e.

400 parts alcohol-wet fibrous nitrocellulose
600 parts alcohol
250 parts super spectra black It must be understood that while I have treated of carbon black in the examples cited, I may use any of the pigments mentioned and they are within the scope of the appended claims.

Having thus described my invention, what I claim and desire to secure by United States Letters Patent is:

1. The process of making pigmented soluble cellulose pulps which includes the steps of providing a suitable quantity of soluble cellulose in the fibrous state wet with an organic liquid, adding thereto a pigment in the form of a pigment pulp having an organic liquid pulping medium, then working the mass while maintaining said cellulose substantially in its fibrous state until the pigment particles and cellulose fibers are uniformly dispersed in the resultant pulp.

2. The process of making pigmented soluble cellulose pulps which includes the steps of providing a suitable quantity of soluble cellulose in the fibrous state wet with an organic liquid, adding thereto a pigment in the form of a pigment pulp having alcohol as a pulping medium, then working the mass while maintaining said cellulose substantially in its fibrous state until the pigment particles and cellulose fibers are uniformly dispersed in the resultant pulp.

3. The process of making pigmented soluble cellulose pulps which includes the steps of providing a suitable quantity of soluble cellulose in the fibrous state wet with an organic liquid, adding thereto a suitable quantity of pigment in the form of a pigment pulp having an organic pulping medium and also contained as an element of an end product to be derived from said colored soluble cellulose pulps, then working the mass while maintaining said cellulose in the fibrous state until the pigment particles and cellulose fibers are uniformly dispersed in the resultant pulp.

4. The process of making pigmented soluble cellulose pulps which includes the steps of providing a suitable quantity of wet soluble cellulose fibers wet with an organic liquid, adding thereto a suitable quantity of pigment, and then working the mass while maintaining the soluble cellulose substantially in its fibrous state until the pigment particles and soluble cellulose fibers are uniformly dispersed in the resultant pulp.

5. The process of making pigmented soluble cellulose pulps which includes the steps of providing a suitable quantity of wet soluble cellulose fibers wet with an organic liquid, adding thereto a suitable quantity of dry pigment, and then working the mass while maintaining the soluble cellulose substantially in its fibrous state until the pigment particles and soluble cellulose fibers are uniformly dispersed in the resultant pulp.

6. The process of making pigmented soluble cellulose pulps which includes the steps of providing a suitable quantity of wet soluble cellulose fibers wet with an organic liquid, adding thereto a suitable quantity of pigment pulp, and then working the mass while maintaining the soluble cellulose substantially in its fibrous state until the pigment particles and soluble cellulose fibers are uniformly dispersed in the resultant pulp.

7. The process of making pigmented soluble cellulose which includes the steps of providing a suitable quantity of soluble cellulose in the fibrous state wet with an organic liquid, adding thereto a suitable quantity of pigment to be incorporated therein, then adding a suitable quantity of organic liquid to the mixture, and then working the resultant mass until the pigment particles and the cellulose fibers are uniformly dispersed in the resultant pulp.

8. The process of making pigmented soluble cellulose which includes the steps of providing a suitable quantity of soluble cellulose in the fibrous state wet with an organic liquid, adding thereto a suitable quantity of dry pigment for incorporation therein, then adding to the mixture a suitable quantity of alcohol, and then working the resultant mass while maintaining the cellulose in the fibrous state until the pigment particles and the cellulose fibers are uniformly dispersed in the resultant pulp.

9. The process of making pigmented soluble cellulose which includes the steps of providing a suitable quantity of alcohol wet soluble cellulose in the fibrous state, adding thereto a suitable quantity of dry pigment for incorporation therein, then adding to the mixture a suitable quantity of denatured alcohol, and then working the resultant mass while maintaining the cellulose in the fibrous state until the pigment particles and the cellulose fibers are uniformly dispersed in the resultant pulp.

10. The process of making pigmented soluble cellulose which includes the steps of providing a suitable quantity of soluble cellulose in the fibrous state wet with an organic liquid, adding thereto a suitable quantity of dry pigment for incorporation therein, then adding to the mixture a suitable quantity of an organic liquid containing sufficient solvents for soluble celluloses to soften but not destroy the fibers thereof, and then working the resultant mass while maintaining the cellulose in the fibrous state until the pigment particles and the cellulose fibers are uniformly dispersed in a pulped condition.

In witness whereof, I have hereunto set my hand to these specifications this 3rd day of January, 1930.

EMILE DE STUBNER.